United States Patent
Markus et al.

(10) Patent No.: US 8,805,984 B2
(45) Date of Patent: Aug. 12, 2014

(54) MULTI-OPERATIONAL TRANSACTIONAL ACCESS OF IN-MEMORY DATA GRIDS IN A CLIENT-SERVER ENVIRONMENT

(75) Inventors: Mircea Markus, London (GB); Manik Surtani, London (GB)

(73) Assignee: Red Hat, Inc., Raleigh, NC (US)

(*) Notice: Subject to any disclaimer, the term of this patent is extended or adjusted under 35 U.S.C. 154(b) by 204 days.

(21) Appl. No.: 13/183,182

(22) Filed: Jul. 14, 2011

(65) Prior Publication Data

US 2013/0019000 A1      Jan. 17, 2013

(51) Int. Cl.
*G06F 15/173* (2006.01)

(52) U.S. Cl.
USPC .......................................................... 709/223

(58) Field of Classification Search
USPC .................................................. 709/223, 224
See application file for complete search history.

(56) References Cited

U.S. PATENT DOCUMENTS

| | | | |
|---|---|---|---|
| 7,290,056 B1* | 10/2007 | McLaughlin, Jr. | 709/230 |
| 2006/0098229 A1* | 5/2006 | Matsunaga et al. | 358/2.1 |
| 2009/0282287 A1* | 11/2009 | Oe et al. | 714/37 |
| 2010/0281107 A1* | 11/2010 | Fallows et al. | 709/203 |
| 2011/0041006 A1* | 2/2011 | Fowler | 714/10 |
| 2011/0246434 A1* | 10/2011 | Cheenath et al. | 707/703 |
| 2011/0258056 A1* | 10/2011 | Ioffe et al. | 705/14.73 |
| 2011/0320420 A1* | 12/2011 | Pardon et al. | 707/703 |
| 2012/0185500 A1* | 7/2012 | Bhogal et al. | 707/769 |
| 2012/0254383 A1* | 10/2012 | Cosmadopoulos et al. | 709/221 |

* cited by examiner

*Primary Examiner* — Jason Recek
(74) *Attorney, Agent, or Firm* — Lowenstein Sandler LLP

(57) ABSTRACT

A client computing system identifies a start of a multi-operational transaction pertaining to access of data stored in caches being managed by nodes residing in Java Virtual Machines in an in-memory data grid. The client computing system stores transaction context data indicating the start of the multi-operational transaction and identifies an application request to perform an operation pertaining to the multi-operational transaction. The application request is from an application that resides outside of the Java Virtual Machines of the nodes. The client computing system determines the transaction context of the operation based on the transaction context data and sends an operation request over a network to a managing node in the in-memory data grid to manage the multi-operational transaction. The operation request includes header data based on the transaction context data.

20 Claims, 11 Drawing Sheets

MULTI-OPERATIONAL TRANSACTIONAL ACCESS OF IN-MEMORY DATA GRIDS IN A CLIENT-SERVER ENVIRONMENT

TECHNICAL FIELD

Embodiments of the present invention relate to accessing in-memory data grids. Specifically, the embodiments of the present invention relate to multi-operational transactional access of an in-memory data grid in a client-server environment.

BACKGROUND

Cloud computing is a model for enabling on-demand network access to a shared pool of configurable computing resources (e.g., networks, servers, storage, applications, and services) that can be rapidly provisioned and released with minimal management effort or service provider interaction. Cloud computing providers currently offer infrastructure as a service (IaaS) and platform as a service (PaaS). IaaS is a provision model in which equipment such as storage equipment, computing equipment, networking equipment, etc. is provided on a per use basis. PaaS is a provision model in which a computing platform and solution stack are delivered to clients as a service on a per use basis. Each of these services has the properties of elasticity (ability to deal with new nodes being added and existing nodes being removed dynamically), high availability, scalability, and linear response times.

One service that has not been successfully moved to the cloud computing model is managed data storage, which is conventionally performed by databases. Data storage is stateful, which makes data as a service (DaaS) much more challenging than any of the other categories of cloud computing. Traditional data storage uses databases such as structured query language (SQL) and not only SQL (NoSQL) databases. Databases do not scale, so they tend to run on a single machine or a few machines running in a fixed cluster. Therefore, databases are not distributed by nature. This becomes a problem in the cloud because in clouds there is no guarantee that a particular server will be available at any given time. The lack of distribution for databases hampers elasticity and high availability, two of the requirements for cloud computing services. Therefore traditional database data storage does not work for DaaS.

Distributed databases, also known as data grids and in-memory data grids, have since become a better alternative to databases in clouds. Examples of data grid platforms include, for example, JBoss® Infinispan®, Oracle® Coherence® or Hadoop™. Data grids can scale up to thousands of nodes. Data grid platforms also improve the scalability of non-cloud applications by removing database bottlenecks and single points of failure. Traditionally, clients have interacted with a data grid platform, such as Infinispan®, in a peer-to-peer (P2P) manner, where the data grid platform and the client code that accesses the data grid platform reside within the same virtual memory. In a P2P environment, clients can perform XA transactions. In the XA (X/Open XA) architecture, an XA transaction is a distributed transaction that consists of multiple operations that access resources, such as an in-memory data grid. For example, a banking application wishes to conduct an XA transaction that consists of two operations (1) deduct money from a first bank account and (2) add the deducted money to a second bank account. Either both of the operations relating to the XA transaction will be permanent, if successful, or none of them will occur, and the data in an in-memory data grid relating to the bank accounts can be rolled back to a previous state as if the transaction never occurred. Traditionally, XA transactions of an in-memory data grid are limited to a P2P environment. However, there are situations when accessing a data grid platform in a client-server mode makes more sense than accessing it via P2P. Conventional client-server access to a data grid, however, is limited to simple, non-transactional access.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for providing multi-operational transactional access of an in-memory data grid in a client-server environment. A client computing system identifies a start of a multi-operational transaction pertaining to access of data stored in caches being managed by nodes residing in Java Virtual Machines in an in-memory data grid. The client computing system stores transaction context data indicating the start of the multi-operational transaction and identifies an application request to perform an operation pertaining to the multi-operational transaction. The application request is from an application that resides outside of the Java Virtual Machines of the nodes. The client computing system determines the transaction context of the operation based on the transaction context data and sends an operation request over a network to a managing node in the in-memory data grid to manage the multi-operational transaction. The operation request includes header data based on the transaction context data.

Embodiments of the present invention allow multi-operational transactional access to an in-memory data grid in a client-server environment. Multiple operations pertaining to a transaction that access an in-memory data grid can either all occur or not. In addition, embodiments of the invention utilize a binary language-neutral protocol to provide support for heterogeneous client and server systems. Use of the language-neutral protocol can allow applications that are written in different programming languages that are different from the programming language of a data grid to access the data grid.

Figure 1:
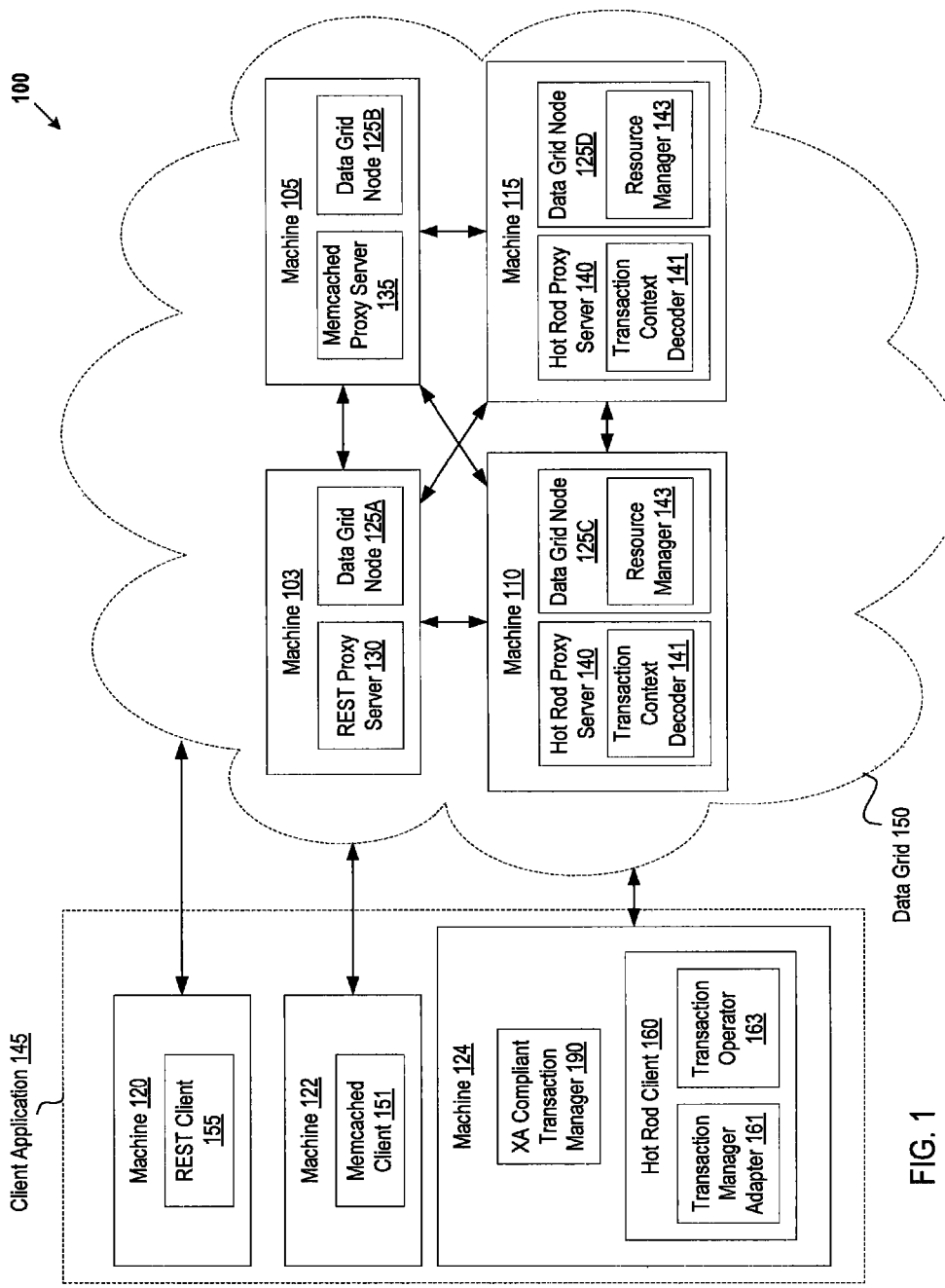
FIG. 1 is an exemplary network architecture in which embodiments of the present invention may operate.

FIG. 1 is an exemplary network architecture 100 in which embodiments of the present invention can be implemented. The network architecture 100 can include multiple machines 103, 105, 110, 115, 120, 122, 124 connected via a network (not shown). The network may be a public network (e.g., Internet), a private network (e.g., a local area network (LAN)), or a combination thereof.

Machines 103, 105, 110, 115, 120, 122, 124 may be hardware machines such as desktop computers, laptop computers, servers, or other computing devices. Each of the machines 103, 105, 110, 115, 120, 122, 124 may include an operating system that manages an allocation of resources of the computing device (e.g., by allocating memory, prioritizing system requests, controlling input and output devices, managing file systems, facilitating networking, etc.). In one embodiment, one or more of the machines 103, 105, 110, 115, 120, 122, 124 is a virtual machine. For example, one or more of the machines may be a virtual machine provided by Amazon® Elastic Compute Cloud (Amazon EC2), a VMWare® virtual machine, etc. In some instances, some machines may be virtual machines running on the same computing device (e.g., sharing the same underlying hardware resources). In one embodiment, one or more of the machines 103, 105, 110, 115 is a Java Virtual Machine (JVM), which may run on a hardware machine or on another virtual machine.

Machines 103, 105, 110, 115 each include a data grid node 125A-D that runs on the machine. The data grid node 125A-D is a data grid application, such as an instance of JBoss® Infinispan®, Oracle® Coherence® or Hadoop™. Each data grid node 125A-D may act as a server for data to clients and as a peer to other data grid nodes 125A-D. Data grid nodes 125A-D are discussed in greater detail below with reference to FIG. 2C.

The data grid nodes 125A-D may communicate via the network to form an in-memory data grid 150. This may include using peer-to-peer protocols to establish and manage membership of the in-memory data grid 150. The peer-to-peer protocols may include functionality for group creation and deletion, peer discovery, peer communication, and so on. In one embodiment, JGroups is used as an underlying peer-to-peer communication mechanism. Alternatively, other peer-to-peer protocols may be used.

The in-memory data grid 150 is a data store that spans multiple machines 103, 105, 110, 115 that are joined in a dynamic cluster. In one embodiment, the in-memory data grid 150 is a NoSQL based data store. The in-memory data grid 150 can be provided to clients using a DaaS model.

In one embodiment, the in-memory data grid 150 operates in a client-server mode, in which the in-memory data grid 150 serves resources (e.g., a stateful data store such as a cache) to client applications 145. In one embodiment, the in-memory data grid 150 acts as a shared storage tier for client applications 145. A separate memory space may be generated for each client application 145. A client application 145 can be any type of application including, for example, a web application, a desktop application, a database management application, a browser application, etc.

The in-memory data grid 150 may include a volatile in-memory data structure such as a distributed cache. A data grid may also provide a persistent data structure (e.g., a data structure stored in non-volatile disk storage). In one embodiment, the in-memory data grid 150 provides a distributed cache with write through or write behind to persistent storage. In one embodiment, Amazon Simple Storage (S3) platform hosts the data for the in-memory data grid 150 as part of a cache store. Other key value based storage systems may also be used to host the data grid's 150 data. An in-memory data grid 150 primarily relies on main memory for data storage. In-memory data grids 150 are faster than disk-optimized data grids since they execute fewer CPU instructions. For brevity and simplicity, an in-memory data grid 150 is used as an example of a data grid throughout this document.

In client-server mode, instances of the data grid nodes 125A-D each start up in a Java Virtual Machine, and a client application 145 can reside outside of the Java Virtual Machines of the data grid nodes 125A-D. In client-server mode, a client application 145 may not be a Java-based application and may not reside in a Java Virtual Machine. In one embodiment, the in-memory data grid 150 is indistinguishable from a database to users and client applications 145. Therefore, client applications 145 may use conventional database formats, protocols and semantics for communicating with the in-memory data grid 150. For example, client applications 145 may communicate with the in-memory data grid 150 using the Hot Rod protocol, the memcached protocol, the REST protocol, the OData protocol, the Websockets protocol, SQL, etc.

However, unlike a database, the in-memory data grid 150 actually distributes stored data across multiple machines 103, 105, 110, 115. The in-memory data grid 150 is elastic (can deal with new nodes being added and nodes being removed), scalable and highly available. The in-memory data grid 150 may also perform load balancing and failover of individual data grid nodes 125A-D. Therefore, the in-memory data grid 150 performs the functions normally provided by databases, but can provide these functions using a DaaS model.

In one embodiment, the data grid nodes 125A-D form a distributed cluster, which causes the in-memory data grid 150 to be a distributed data grid. This enables the in-memory data grid 150 to scale linearly as more data grid nodes 125A-D are added to the cluster. In one embodiment, distribution makes use of a consistent hash algorithm to determine where in the cluster entries should be stored. The hashing algorithm may be configured to maintain a specified number of copies of each entry in the in-memory data grid 150. In one embodiment, the hashing algorithm is deterministic in locating entries without resorting to multicasting requests or maintaining expensive metadata.

In one embodiment, the in-memory data grid 150 provides a rich and powerful application programming interface (API) that looks and feels like a database. A client may communicate with any data grid node 125A-D of the in-memory data grid 150 to access data stored in the in-memory data grid 150. A data grid node 125A-D may receive database commands, such as commands to store objects, to retrieve objects, to perform searches, etc. When a data grid node 125A-D receives a command to store an object, the data grid node 125A-D divides the object into a collection of linked key value pairs. The data grid node 125A-D then stores some or all of these key value pairs. Additional data grid nodes 125A-D may also store some or all of the key value pairs. One embodiment of linking key value pairs is described in greater detail below in conjunction with FIG. 5. When any of the data grid nodes 125A-D receives a request for the stored object, that data grid node 125A-D gathers up all of the key value pairs for that object, and reconstructs the object from the key value pairs. This may involve requesting the key value pairs from one or more other data grid nodes 125A-D. Once the object is reconstructed, the data grid node 125A-D returns the object to the client from which the request was received.

The data grid nodes 125A-D are each configured to operate using a specific protocol. Therefore, the data grid nodes 125A-D expect to receive objects having a specific type and commands having a specific format. The data grid nodes 125A-D operate on objects having a predefined type. In one embodiment, the data grid nodes 125A-D operate on Java objects and/or on Javascript object notation (JSON) objects. Client applications 145 may communicate with the in-memory data grid 150 using the specific protocol that the in-memory data grid 150 uses to manage data. In one embodiment, the data grid nodes 125A-D are configured to respond to commands formatted in a key value based NoSQL database format. Alternatively, clients may communicate with the in-memory data grid 150 using additional protocols.

To enable clients configured for different protocols to access the in-memory data grid 150, the in-memory data grid 150 may include one or more proxy servers 130, 135, 140. Each proxy server 130, 135, 140 may be used to translate objects and requests into the specific formats used by the data grid nodes 125A-D. Each proxy server 130, 135, 140 includes internal rules on how to translate an incoming protocol into a protocol used by the in-memory data grid 150, and how to translate responses going out from the protocol used by the in-memory data grid 150 into the protocol used by the client application 145 or by a specific component 151, 155, 160 of the client application 145.

In one embodiment, one or more of the data grid nodes 125A-D is collocated with a proxy server 130, 135, 140. Additionally, a data grid node 125A-D may be collocated with multiple proxy servers 130, 135, 140. The proxy servers 130, 135, 140 provide a layer of indirection for the in-memory data grid 150. Each proxy server 130, 135, 140 is configured to translate objects and requests between the specific protocol supported by the data grid nodes 125A-D and an external protocol. Examples of proxy servers include a REST proxy server 130, a memcached proxy server 135 and a Hot Rod proxy server 140. Other examples of proxy servers include a web socket proxy server, an OData proxy server, etc.

Each proxy server 130, 135, 140 may be an endpoint that appears to client applications 145 as a backend storage server. Client applications 145 may communicate with the proxy servers 130, 135, 140 as though the proxy servers are full backend storage servers. Each proxy server 130, 135, 140 may be configured to listen to a specific port or ports, and act on messages sent to those ports.

To use the in-memory data grid 150, a client application 145 acquires a session from the in-memory data grid 150, and sends commands to the in-memory data grid 150 via the session. Client application 145 may be a standalone application running on a single machine. Alternatively, client application 145 may be a system with multiple clients 151, 155, 160, each of which may run in a separate machine 120, 122, 124. The clients 151, 155, 160 may each run on a different system, use a different protocol, be written in a different language, operate on a different platform, etc. For example, a web application may have a Java middleware component that serves up web applications, and another component that is a part of one of the web applications. For example, if a web application uses Ajax and client side Javascript in a user's browser, the user's browser may communicate directly to the in-memory data grid 150 to populate the browser's screen. A third component of the client application 145 may be a python script that monitors all data and processes orders as and when they are placed in the in-memory data grid 150.

In one example embodiment, the client application 145 includes a memcached client 150, a REST client 155, and a Hot Rod client 160. Each of these clients 150, 155, 160 may communicate with the distributed in-memory data grid 150 using their specific protocols. In one embodiment, each client is configured to communicate with a particular proxy server (e.g., is configured with a network address of the particular proxy server). Each client may also be configured with network addresses of multiple proxy servers, and may be able to fail over across the proxy servers. For example, each client may be configured with a network address or addresses for a cluster of proxy servers, wherein each proxy server in the cluster handles communications formatted according to the protocol used by the client. In one embodiment, a load balancer (e.g., an HTTP load balancer for a REST proxy server 130) manages load for the cluster. Examples of HTTP load balancers include Apache® mod_cluster, Jboss® mode_cluster, Big-IP®, etc. Other load balancers may be used for the REST proxy servers and/or for other proxy servers.

In an example, the Hot Rod client 160 may send an object and a request that are formatted according to the Hot Rod protocol to the distributed in-memory data grid 150. Hot Rod is a general purpose protocol for accessing in-memory data grids in a client-server environment. Hot Rod is a binary protocol to ensure platform neutral behavior. The request and object may be received by the Hot Rod proxy server 160 and translated into the backend protocol used by data grid nodes 125A-D. The data grid nodes 125A-D may then perform one or more operations in response to the request.

A number of operations can be performed on the in-memory data grid 150. Conventional operations include simple operations, such as, get, put, remove, and replace. Getting and updating data in the in-memory data grid 150 may be performed by calling get, put, remove and/or replace functions on an instance of the in-memory data grid 150. Traditional access to an in-memory data grid 150 in a client-server environment has been limited to simple operations and does not include multi-operational transactions. A multi-operational transaction can be an XA transaction. In the XA (X/Open XA) architecture, an XA transaction is a distributed transaction that consists of multiple operations that access one or more resources.

Unlike a client-server environment to access an in-memory data grid 150, a client, such as a Hot Rod client 160, can include a transaction manager adapter 161 and a transaction operator 163 to add support for multi-operational transactional access of the data grid nodes 125A-D in the in-memory data grid 150 in a client-server environment. The transaction manager adapter 161 can track the current context with regard to whether operations being requested by a client application 145 are in the context of a transaction or not. The transaction operator 163 can add new operations, for example, start, prepare, commit, rollback, and recover operations, to perform multi-operational transactional access on the in-memory data grid 150 in a client-server environment. Performing operations that pertain to multi-operational transactional access on data in the in-memory data grid 150 may be performed by calling the get, put, remove, replace, start, prepare, commit, rollback, and recover functions on an instance of the in-memory data grid 150.

A proxy server, such as a Hot Rot proxy server 140, can include a transaction context decoder 141, that can receive requests pertaining to a multi-operational transaction from a transaction operator 163 and can decode and translate the request in a protocol that is compliant with a resource manager 143 in a data grid node, such as node 125C. A data grid node 125A-D can include a resource manager 143 to store data for tracking all operation requests associated with a transaction identifier. A data grid node 125C-D that includes a resource manager 143 can be a resource manager data grid node to manage the operations pertaining to a transaction. The resource manager 143 can be an XA compliant resource manager. The resource manager 143 can pass along an operation request to a data grid node 125A-D.

The operations that pertain to a transaction are considered to be within the scope of a transaction. Some multi-operational transactional standards, such as the XA standard, use a two-phase commit protocol to ensure that all resources enlisted within a transaction either commit or rollback any particular transaction consistently (all of the resources do the same). A transaction must succeed or fail as a complete unit. If any of the operations within the scope of a transaction are not successful, none of the operations within the scope of the transaction are committed to an in-memory data grid 150.

For example, a banking application 145 wishes to conduct a transaction that consists of two access operations: (1) deduct money from a first bank account and (2) add the deducted money to a second bank account. The bank accounts can have data in one or more data grid nodes 125A-D in the in-memory data grid 150. For example, the data for the first bank account is stored in data grid node 125A and the data for the second bank account in stored in data grid node 125B. The operations may be requests to change the dollar amount in each bank account. The banking application 145 can make requests for transactional access of the in-memory data grids 160 via the transaction manager 190, transaction manager adapter 161, transaction operator 163, transaction context decoder 141, and resource manager 143. Before the operation that deducts money from the first bank account is committed to data grid node 125A in the in-memory data grid 150, the resource manager 143 can first ensure that the operation made to add money to the second bank account in data grid node 125B is successful. The resource manager 143 can make sure that either all of the operations within the scope of transaction successfully happen or none of them occur. For instance, there may be a system failure or an operation failure pertaining to one of the data grid node 125A-D with regard to deducting money from the first bank account and/or adding money to the second bank account. In such a case, the banking application 145 may wish that the operations that deducted money from the first bank account and adding money to the second account, as well as any other operations performed within the scope of the transaction, rollback to a previous state.

In one embodiment, communications may be routed to an appropriate proxy server 130, 135, 140, which may then translate the communications into the protocol used by the data grid nodes 125A-D on the back end (e.g., into a key value based NoSQL database format). In one embodiment, each data grid node 125A-D includes a request router (not shown). Additionally, or in the alternative, each proxy server may include a request router. The request router may determine, based on a format of a received communication, the protocol in which the communication was formatted. For example, the request router may include different communication categorization rules. If a received communication satisfies, for example, a Hot Rod protocol communication categorization rule, the data grid node 125A-D may determine that the communication is formatted according to the Hot Rod protocol. The request router may forward the communication to an appropriate proxy server that is configured to handle communications having the determined protocol. In one embodiment, the request router includes a table of proxy servers, each entry in the table including one or more addresses for proxy servers and an associated protocol. The table may be used to determine a proxy server to forward a communication to.

Figure 2A:
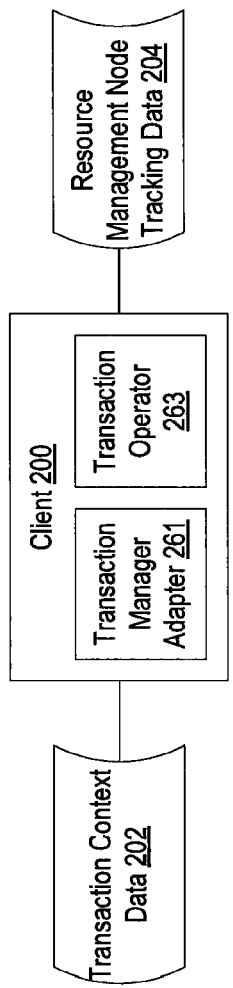
FIG. 2A illustrates a block diagram of a client, in accordance with one embodiment of the present invention.

FIG. 2A is a block diagram of one embodiment of a client 200 for providing multi-operational transactional access of data grid nodes in an in-memory data grid in a client-server environment. In one embodiment, the client 200 is the same as the clients 151, 155, 160 of FIG. 1. In one embodiment, a client 200 (e.g., Hot Rod client 160 in FIG. 1) can include a transaction manager adapter 261 and a transaction operator 263. The transaction manager adapter 261 and a transaction operator 263 can extend a client-server language neutral protocol, such as a Hot Rod protocol, for accessing an in-memory data grid to add support for multi-operational transactional in a client-server environment.

The transaction manager adapter 261 can identify a start of a multi-operational transaction to access data in an in-memory data grid. The multi-operational transaction can be an X/Open XA transaction. An application can send an XA compliant transaction manager notification of the start of the multi-operational transaction and the XA compliant transaction manager can notify the transaction manager adapter 261 of the start of the transaction. The XA compliant transaction manager can generate and provide a transaction identifier for the transaction to the transaction manager adapter 261. The multi-operational transaction can pertain to access of data stored in caches being managed by a nodes residing in Java Virtual Machines in an in-memory data grid. The transaction manager adapter 261 can store transaction context data 202 in a data store that is coupled to the transaction manager adapter 261. The transaction context data 202 can indicate that the client is in a multi-operational transaction mode for a particular transaction. The transaction context data 202 can include a transaction identifier. The transaction identifier can be a XA compliant transaction identifier.

A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The transaction operator 263 can identify an application request to perform an operation for the transaction. For example, the application request is to put a value of $0 in bank account 5552191234. The transaction operator 263 can receive a method call via an API from an application requesting an operation to be performed on the data stored in the caches in the in-memory data grid. The application resides outside of the Java Virtual Machines of the nodes in the in-memory data grid. The transaction operator 263 can query the transaction manager adapter 261 to determine what state the transaction manager adapter is in 261. The transaction manager adapter 261 can examine the transaction context data 202 and respond to the query. For example, the transaction manager adapter 261 sends a query response to the transaction operator 263 that the state is in a multi-operational transaction state.

When the transaction context data 202 reflects a multi-operational transaction state, the transaction operator 263 can add transaction context data to a header for a request to send to a node in the in-memory data grid to perform the operation requested by the application. A request header can contain a transaction type field and a transaction identifier field. Table 1 below illustrates a portion of an exemplary request header.

TABLE 1

[TX_TYPE] [TX_ID]

The transaction identifier can include a field, such as [TX_TYPE], to represent a transaction type. The transaction type field can be a one byte field and can contain a value that represents whether a request is associated with a transaction. Table 2 below illustrates exemplary field values and type descriptions. The transaction type field can be extended to include other transaction types. The transaction operator 263 can set the value in the transaction type field.

TABLE 2

| TX_TYPE Value | Type Description |
| --- | --- |
| 0 | Non-transactional call, or client does not support transactions. The subsequent TX_ID field can be omitted. |
| 1 | Multi-operational transaction identifier (XID). The XID can be an a fixed-size format. |

The request header can also include a field, such as [TX_ID], to represent a transaction identifier. The transaction identifier field can be a fixed-length byte array containing a transaction ID (identifier). The length and format of the transaction identifier can be associated with the value of the transaction type field. For example, TX_TYPE of 0 can mean a 0-length TX_ID. The client can generate and include a transaction identifier in the request header.

The transaction operator 263 can identify a resource manager data grid node in the in-memory data grid to manage the transaction. For example, the transaction operator 263 can randomly select one of the machines in the in-memory data grid that includes a transaction context decoder and a resource manager. In another example, a client application may specify in an application request which machine in the data grid should manage the transaction. The transaction operator 263 can store resource management node tracking data 204 in a data store to track which node is the resource manager data grid node to manage the particular transaction. The resource management node tracking data can include, for example, a transaction identifier and a corresponding machine identifier and/or node identifier. Any subsequent requests to be sent to the in-memory data grid for a particular transaction identifier can be sent to the same resource manager data grid node that has been assigned to the particular transaction identifier as specified by the resource management node tracking data 204.

The transaction operator 263 can send an operation request over a network to the resource manager data grid node in the in-memory data grid. The transaction operator 263 can generate and send an operation request for prepare, rollback, commit, and recover operations. The operation request can include a request header that contains a transaction type field and transaction identifier field. For example, the operation request has a transaction type field value of '1' to indicate that the operation is associated with a transaction. The header data can also include an operation code for the operation to be performed and a cache name of the cache that stores the data for the operation.

The transaction operator 263 can identify a next application request to perform an operation relating to a multi-operational transaction. For example, the next application request is for an operation to PUT a value of $1000 in bank account 5558675309. The transaction operator 263 can determine which node in the data grid is the resource manager data grid node for this particular transaction by comparing the transaction identifier in the next application request to the resource management node tracking data 204. The transaction operator 263 can send a next operation request over a network to the resource manager data grid node in the in-memory data grid. The next operation request can include the transaction type and transaction identifier in a header.

A request for a prepare operation is a request for a resource manager data grid node to cause any operations that were performed for a particular transaction to be prepared for commitment. A prepare operation request can cause data grid nodes that have performed operations relating to a particular transaction to take the necessary steps for ensuring that a future commit request will succeed. A request for a commit operation is a request for a resource manager data grid node to cause any operations that were performed for a particular transaction to be committed. A commit operation request is a request for a resource manager data grid node to make a set of changes that were made to a cache permanent. A request for a rollback operation is a request for a resource manager data grid node to cause any operation that were performed for a particular transaction to be returned to a previous state. A request for a recover operation is a request receive a list of all prepared or heuristically finished transactions to confirm whether or not a particular transaction was successfully committed. A transaction that is listed in a prepared state can be an indication that the transaction is not yet committed.

Figure 2B:
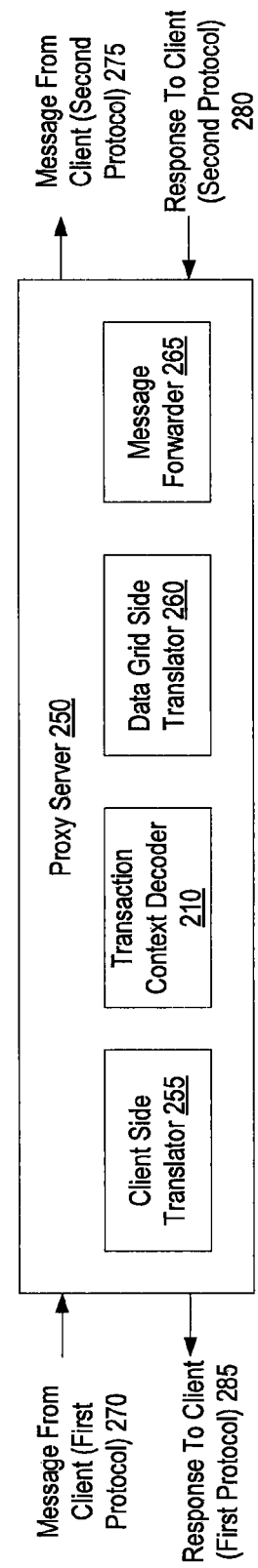
FIG. 2B illustrates a block diagram of a proxy server, in accordance with one embodiment of the present invention.

FIG. 2B illustrates a block diagram of a proxy server 250, in accordance with one embodiment of the present invention. The proxy server 250 may correspond to Hot Rod proxy server 140, REST proxy server 130, or memcached proxy server 135 of FIG. 1. The proxy server 250 may also be another type of proxy server, such as a Websocket proxy server. In one embodiment, the proxy server 250 is installed on a machine that includes a data grid node 205. For example, a proxy server 250 may run along with a data grid node inside a single instance of a Java Virtual Machine (JVM). Alternatively, the proxy server 250 may be installed on a machine that does not include any data grid nodes.

Each proxy server 250 listens on a specified port or ports. Clients connect to a port, send commands to the proxy server, read responses, and eventually close the connection. Each proxy server 250 provides a distinct mechanism (e.g., an application programming interface (API)) for connecting to the same data grid, and operates as a distinct endpoint for the data grid. For example, the REST proxy server includes a REST API that enables a REST client to interact with the data grid using standard hypertext transport protocol (HTTP) commands. By providing multiple protocols for communicating with the data grid, multiple different clients written in different languages, running on different platforms, and performing different actions can all use the same data.

In one embodiment, each proxy server 250 includes a client side translator 255, a data grid side translator 260 and a message forwarder 265. Proxy server 250 receives a message 270 from a client that is formatted according to a first protocol. In one embodiment, a proxy server 250, such as one using the Hot Rod protocol (e.g., proxy server 140 in FIG. 1), includes a transaction context decoder 210 as another server-side component. A transaction context decoder 210 supports transactional client-server access to the data grid. The received message 270 may include an object (data) to be stored. Transaction context decoder 210 reads any transaction identifier that may be included in a header in the message 270 and translates the message 270 and/or the object into a second format that is compliant with a protocol used by a resource manager in a data grid node to handle the multi-operational transaction aspects of the message 270. For example, the transaction context decoder 210 can translate the message 270 to be XA compliant. In one embodiment, client side translator 255 also translates the message 270 and/or the object into a format that is compliant with a protocol used by a data grid node. In one embodiment, the object is translated into a Java object or a JSON object. Message forwarder 265 then forwards the translated message 275 and object to the resource manager on the data grid node.

The data grid node generates a response message 280 having a format compliant with the protocol of the data grid node, and sends this response to proxy server 250. The response 280 may include an object (e.g., if the message was a request for an object). Data grid side translator 260 translates the response message 280 and/or the object from the second protocol to a format compliant with the protocol used by the resource manager in the data grid node to handle the multi-operational transaction aspects of the message 280. In one embodiment, data grid side translator 260 also translates the message 280 and/or the object into a format that is compliant with a protocol used by the client. For example, data grid side translator 280 may translate a JSON object into a binary array or base 64 encoded binary data. Message forwarder 265 then forwards the translated response 285 and/or object to the client. Therefore, each proxy server 250 is able to encode and decode data so that it is able to communicate with clients in a manner compliant to a first protocol and is able to communicate with data grid nodes in a manner compliant to a second protocol.

In one embodiment, the proxy server 250 is clustered with other proxy servers of the same type. This can enable the proxy server 250 to perform load balancing and failover. Clients wanting to load balance or failover between Hot Rod proxy servers can do so with the Hot Rod proxy server replicating or distributing data using, for example, consistent hash algorithms.

In one embodiment, the proxy server 250 is a Hot Rod proxy server. The Hot Rod proxy server translates messages and data between a format compliant with the Hot Rod protocol and a format compliant with another protocol used by the data grid. This allows clients using protocols that are different from the protocol used by the data grid to be able to communicate with the data grid. The Hot Rod protocol is a binary client-server protocol that transmits keys and values as bytes to ensure platform neutral behavior. Hot Rod clients communicate with the Hot Rod proxy server through transmission control protocol (TCP) connections. In one embodiment, the implementation of the protocol uses the Java programming language. Hot Rod allows for dynamic load balancing and failure. A Hot Rod client can dynamically detect changes in the topology of Hot Rod servers when they are clustered. When new data grid nodes are added or removed, Hot Rod clients can update a topology view of a Hot Rod server topology. When Hot Rod server are configured with distribution, Hot Rod clients can detect where a particular key resides and can route request intelligently.

Hot Rod includes several operations, such as get, remove, put, replace, remove, and is extended to include operations to support multi-operational transactions, such as start transaction, prepare, commit, rollback, and recover. An operation can ask the Hot Rod proxy server to perform an operation on some data identified by a key. One embodiment of linking key value pairs is described in greater detail below in conjunction with FIG. 5.

Figure 2C:
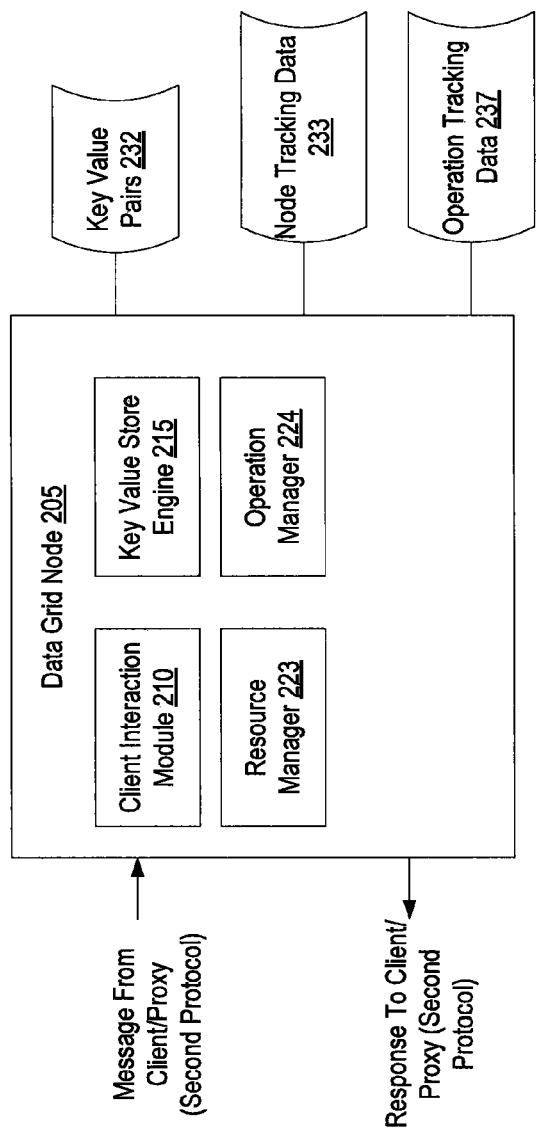
FIG. 2C illustrates a block diagram of a data grid node, in accordance with one embodiment of the present invention.

FIG. 2C illustrates a block diagram of a data grid node 205, in accordance with one embodiment of the present invention. The data grid node 205 may correspond to a resource manager data grid node, such as nodes 125C-D of FIG. 1. The data grid node 205 may correspond to a data grid node that can perform an operation on a cache, such as nodes 125A-D of FIG. 1. In one embodiment, the data grid node 205 is collocated on a machine with one or more proxy servers 250. In one embodiment, the data grid node 205 runs in a Java Virtual Machine (JVM) environment. The JVM may run in another environment, such as Windows® OS or Linux® OS. Alternatively, the data grid node 205 may run in other environments (e.g., directly on a Windows® OS, on a Linux® OS, etc.).

The data grid node 250 operates in a cluster with other data grid nodes to form a data grid. Each data grid node 250 may act as a server for the data grid. Therefore, a client may access any of the data grid nodes 250 to gain access to the entire data grid. New data grid nodes can be started and connected to the other data grid nodes without performing rehashing or state transfer. Therefore, startup times for new data grid nodes can be predictable and relatively short.

In one embodiment, the data grid node 250 includes a client interaction module 210, a resource manager 223, an operation manager 224, and a key value store engine 215. The client interaction module 210 receives requests from clients and sends responses to clients. Requests may include requests to store objects, to retrieve objects, to search for objects, to retrieve information about objects, and so on. Responses may include objects, information about objects, confirmation messages, error messages, etc. The requests and responses are configured in a specific format understandable to the data grid node 205. Received requests may have been translated into the specific format by a proxy server. In one embodiment, the requests and responses have a key value based NoSQL database format. For example, the requests, responses and/or objects (payloads) may have a simple format of keys mapped to values.

Requests may include requests to perform operations. A number of operations can be performed on the data grid such as get, put, remove, notify and unnotify. Getting and updating data in the data grid may be performed by calling the get, put and remove functions on an instance of the data grid. A transaction made up of multiple operations can be performed on the data grid. The multi-operational transaction can be an XA transaction. Additional operations can be performed on the data grid to support multi-operational transactions, such as start, prepare, rollback, commit, and recover. Starting a transaction, preparing data, rolling back data, committing data, and recovering data in the data grid may be performed by calling start, prepare, rollback, commit, and rollback functions on an instance of the data grid. These operations could be triggered by user interaction with a web form, for example.

When the client interaction module 210 receives a request to perform an operation, the resource manager 223 can examine transaction context data in a header in the operation request to determine whether the operation is associated with a multi-operational transaction. The transaction context data can include a transaction type and a transaction identifier. The resource manager 223 can store operation tracking data 237 in a data store that is coupled to the resource manager 223 to track which operations are associated with particular transaction identifiers.

An operation request can include a key-value pair indicating the data that is to be operated on and a value for the operation and the data. For example, the operation request is to put a value of $0 in bank account 5552191234. The operation request can include a key that represents the account number, such as '552191234', and a value, such as '0'. The key value store engine 215 can obtain a key-value pair from an operation request and can store the key-value pair 232 in an in-memory container. The key value pairs 232 can be distributed across the data grid. That way the stored object is fault tolerant and highly available.

The key value store engine 215 can use a cache name and a key that is specified in an operation request to identify which nodes have cache data associated with cache name and the key. The resource manager 223 can store node tracking data 233 in a data store that is coupled to the resource manager 223 to associate the node with the transaction identifier. The node tracking data 233 can include the transaction identifier and a node identifier. The resource manager 223 can send the operation request to the identified node to perform the operation.

A data grid node 205 which is identified by a key value store engine 215 to have cache data that is associated with cache name and the key in an operation request can include an operation manager 224 to perform the requested operation (e.g., put, replace, prepare, rollback, commit) on the cache data that is coupled to the operation manager 224. The operation manager 224 can receive an operation request from a resource manager 223 to perform an operation on a local cache. The request may be to perform a get, put, remove, replace, prepare, rollback, commit, or recover. The operation manager 224 can examine a field in the header of the operation request to determine whether the operation request is associated with a multi-operational transaction. The operation manager 224 can identify a transaction identifier for the transaction from a field in the header of the operation request and store operation tracking data 237 in a data store that is coupled to the operation manager 224 to associate the operation to be performed with the transaction identifier. The operation tracking data 237 can include the transaction identifier and an operation identifier. The operation manager 224 can perform the operation (e.g., put, replace, prepare, rollback, commit) on the cache using the key and value that is included in the request. One embodiment of an operation manager performing prepare, rollback, and commit operations is described in greater detail below in conjunction with FIG. 7.

When an operation request is for a prepare, commit, rollback, or recover operation, the resource manager 223 examine the node tracking data 233 to identify which nodes have performed operations that are associated with the transaction identifier. The resource manager 223 can send an operation request to each identified node to perform the operation. Each data grid node that is associated with the transaction identifier can receive the operation request, perform operation (e.g., prepare, rollback, commit), and send a status response to the resource manager data grid node. The resource manager 223 can receive a status response from each node can send out another operation request based on the received status responses. For example, a status response can indicate that the operations that were performed were successfully prepared for commitment or that the operations were not successfully prepared. If the resource manager 223 node receives successful status responses from each of the node, the resource manager 223 can send an operation request to the nodes that performed the prepare operations to now commit the operations.

Figure 3:
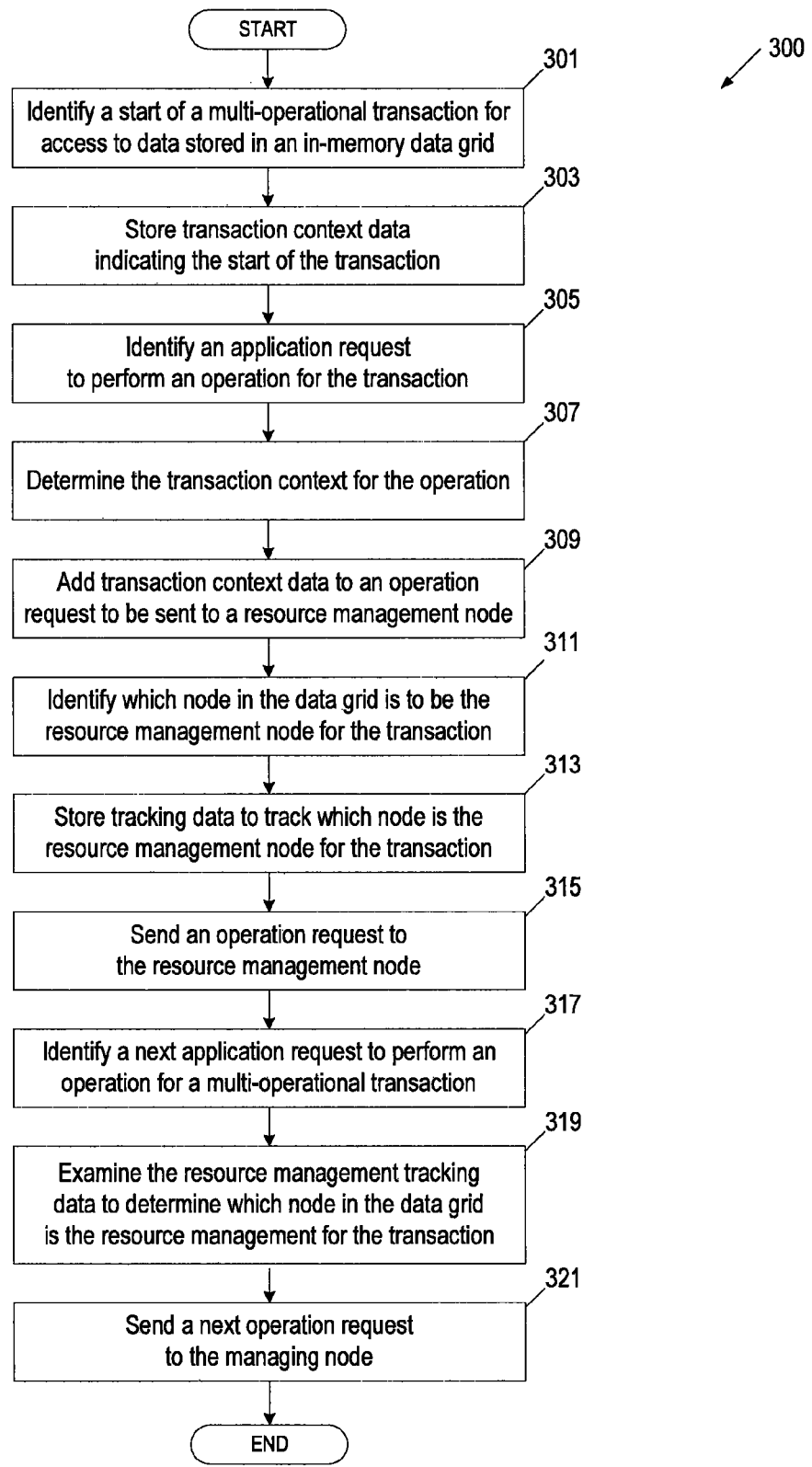
FIG. 3 is a flow diagram of an embodiment of a method for providing multi-operational transactional access of an in-memory data grid in a client-server environment.

FIG. 3 is a flow diagram of an embodiment of a method 300 for providing multi-operational transactional access of an in-memory data grid in a client-server environment. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by a client 160 of FIG. 1. At block 301, the client identifies a start of a multi-operational transaction to access data stored in caches being managed by a nodes residing in Java Virtual Machines in an in-memory data grid. At block 303, the client stores transaction context data indicating the start of the transaction, which can include the transaction identifier. At block 305, the client identifies an application request to perform an operation for the transaction. For example, the operation is to put a value of $0 in bank account 5552191234. At block 307, the client determines the transaction context of the operation from the stored transaction context data and adds transaction context data to a header for a request to send to a node in the in-memory data grid to perform the operation at block 309. A request header can contain a transaction type field and a transaction identifier field.

At block 311, the client identifies a resource manager data grid node in the data grid to manage the transaction and stores resource management node tracking data to track which node is the resource manager data grid node to manage the transaction at block 313. The resource management node tracking data can include, for example, a transaction identifier and a corresponding machine identifier and/or node identifier. Any subsequent requests to be sent to the a node in the in-memory data grid for a particular transaction identifier can be sent to the same resource manager data grid node that has been assigned to the particular transaction identifier as specified by the resource management node tracking data.

At block 315, the client sends an operation request over a network to the managing node in the in-memory data grid to manage the multi-operational transaction of accessing the caches being managed by the nodes in the in-memory data grid. The operation request can include a request header that contains a transaction type field and transaction identifier field. For example, the operation request has a transaction type field value of '1' to indicate that the operation is associated with a transaction. At block 317, the client identifies a next application request to perform an operation relating to a multi-operational transaction. For example, the operation is to put a value of $1000 in bank account 5558675309. At block 319, the client determines which node in the data grid is the resource manager data grid node for this particular transaction. The client locates the transaction identifier the header data in the next application request and searches the management node tracking data for a match and the node that is assigned to managed this particular transaction. At block 321, the client sends a next operation request over a network to the resource manager data grid node in the in-memory data grid. Method 300 can be a recursive method, such that the client can receive additional application requests to perform operations, determine which node is the resource manager data grid node that is managing the transaction, and send the requests to the resource manager data grid node.

Figure 4:
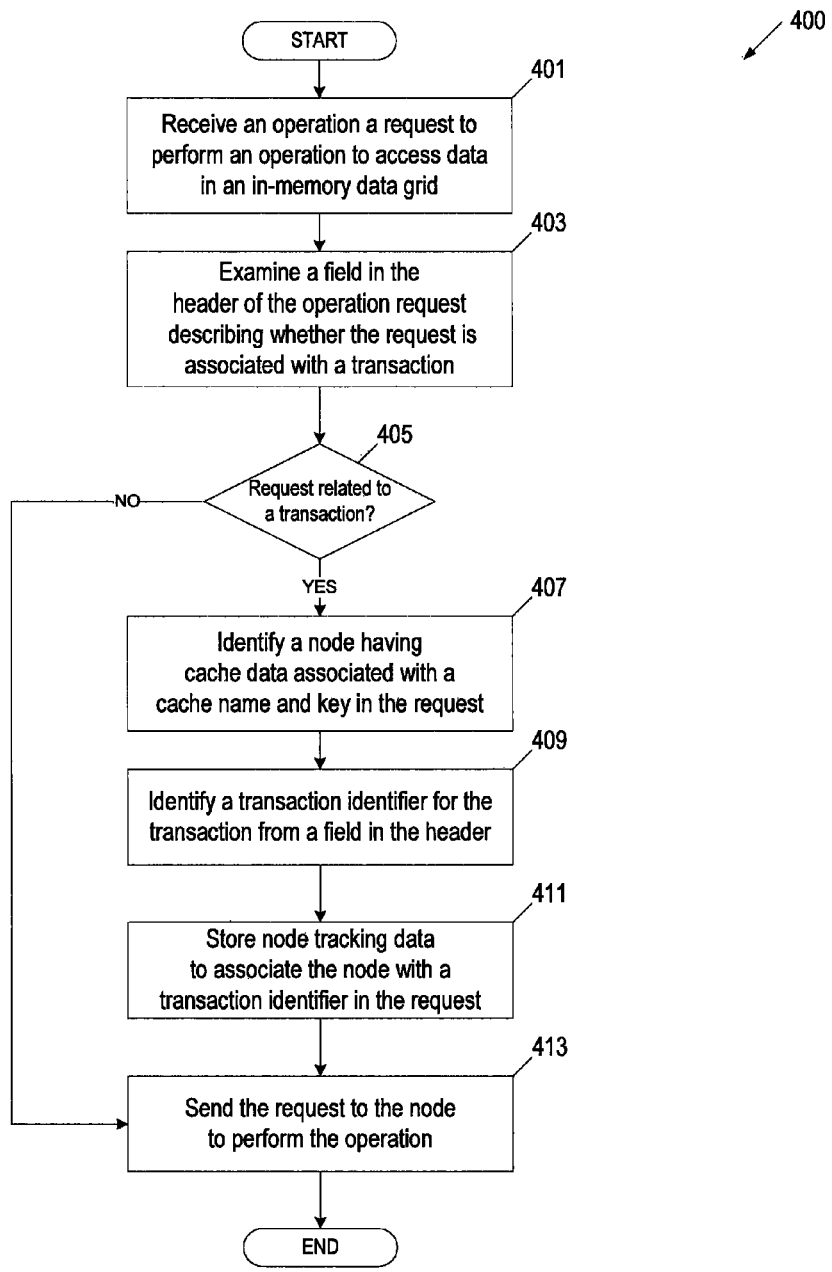
FIG. 4 is a flow diagram of an embodiment of a method for managing a multi-operational transaction pertaining to an in-memory data grid in a client-server environment.

FIG. 4 is a flow diagram of an embodiment of a method 400 for managing a multi-operational transaction pertaining to an in-memory data grid in a client-server environment. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by a resource manager data grid node, such node 125C, of FIG. 1.

Figure 5:
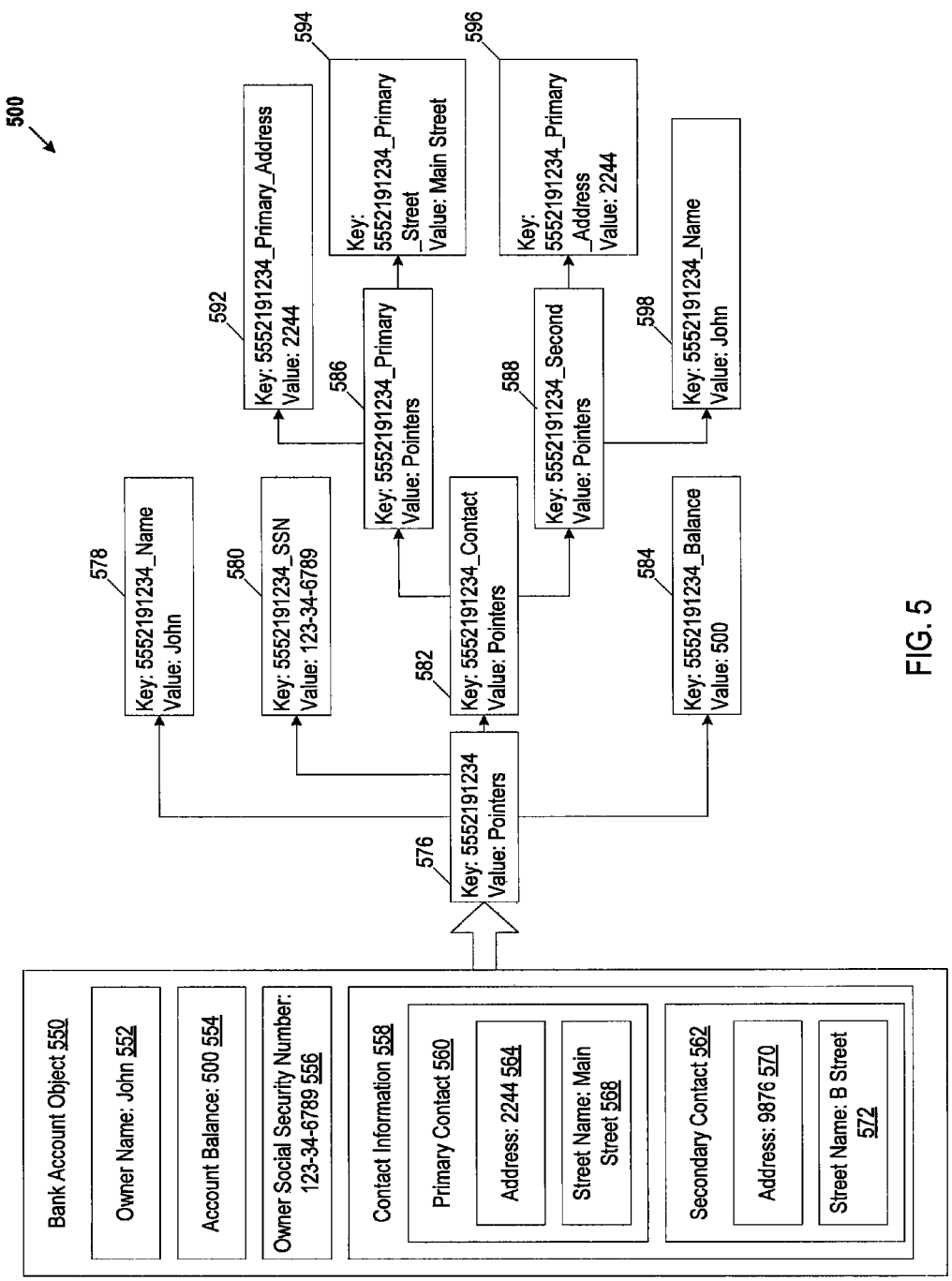
FIG. 5 illustrates an object and a collection of key value pairs generated from the object, in accordance with one embodiment of the present invention.

At block 401, the resource manager data grid node receives an operation request to perform an operation to access data in an in-memory data grid. For example, the operation is to put a value of $0 in bank account number 5552191234. The request can include a cache name. For example, the cache name may be "bank account" and can store a bank account object. FIG. 5 illustrates an object 550 and a collection of key value pairs 575 generated from the object 550, in accordance with one embodiment of the present invention. As shown, the object 550 includes the following fields: owner name 552, account balance 554, owner social security number (SSN) 556 and contact information 558. Fields 552, 554, 556 have primitive types. However, the contact information field 558 is a complex field for an internal object. The internal object has a primary contact field 560 and a secondary contact field 562, both of which are themselves complex fields for further internal objects. Primary contact field 560 includes an address field 564, and a street name field 568. Similarly, secondary contact field 562 includes an address field 570 and a street name field 572.

The collection of key value pairs 575 includes a primary key value pair 576. The primary key value pair 576 has a key of "5552191234" that represents an account number, which a data grid node can use to retrieve the primary key value pair 576. The primary key value pair's values are pointers to key value pairs 578, 580, 582, 584. Key value pairs 578, 580, 584 were generated from fields having primitive types. Therefore, the values of these key value pairs 578, 580, 584 are the contents of those fields.

Key value pair 582 was generated for an internal object (complex field 558). Therefore, key value pair 582 is a primary key value pair for the internal object. Key value pair 582 includes pointers to key value pairs 586, 588. Each of key value pairs 566, 568 is a primary key value pair for an additional nested object. Key value pair 586 includes pointers to key value pairs 592, 594. Key value pair 488 includes pointers to key value pairs 596, 598. Due to the pointers linking the key value pairs, a data grid node can retrieve all of the key value pairs and use them to reconstruct the object based on the unique identifier "5552191234."

Returning to FIG. 4, at block 403, the resource manager data grid node examines a field in the header of the operation request describing whether the request is associated with a transaction. If the operation request is not associated with a multi-operational transaction (block 405), the resource manager data grid node determines which node in the data grid to send the operation request to and sends an operation request to the node at block 413. The nodes store mapping data of which caches reside in which nodes. The request can specify a cache name and key and the resource manager data grid node can use the mapping data to send the request to a node in the data grid that contains a cache having the cache name and key.

If the operation request is associated with a multi-operational transaction (block 405), the resource manager data grid node identifies a node having cache data associated with a cache name (e.g., bank account) in the header of the operation request at block 407. At block 409, the resource manager data grid node identifies a transaction identifier for the transaction from a field in the header and stores node tracking data to associate the node with the transaction identifier. The node tracking data can include the transaction identifier and a node identifier. At block 413, the resource manager data grid node sends the request to the identified node to perform the operation. Method 400 can be a recursive method, such that the resource manager data grid node can receive additional operation requests, determine whether a request is associated with a transaction, update the node tracking data, and send the requests to the appropriate nodes to perform the operations. For example, an additional operation request is to put a value of $1000 in bank account 5558675309.

Figure 6:
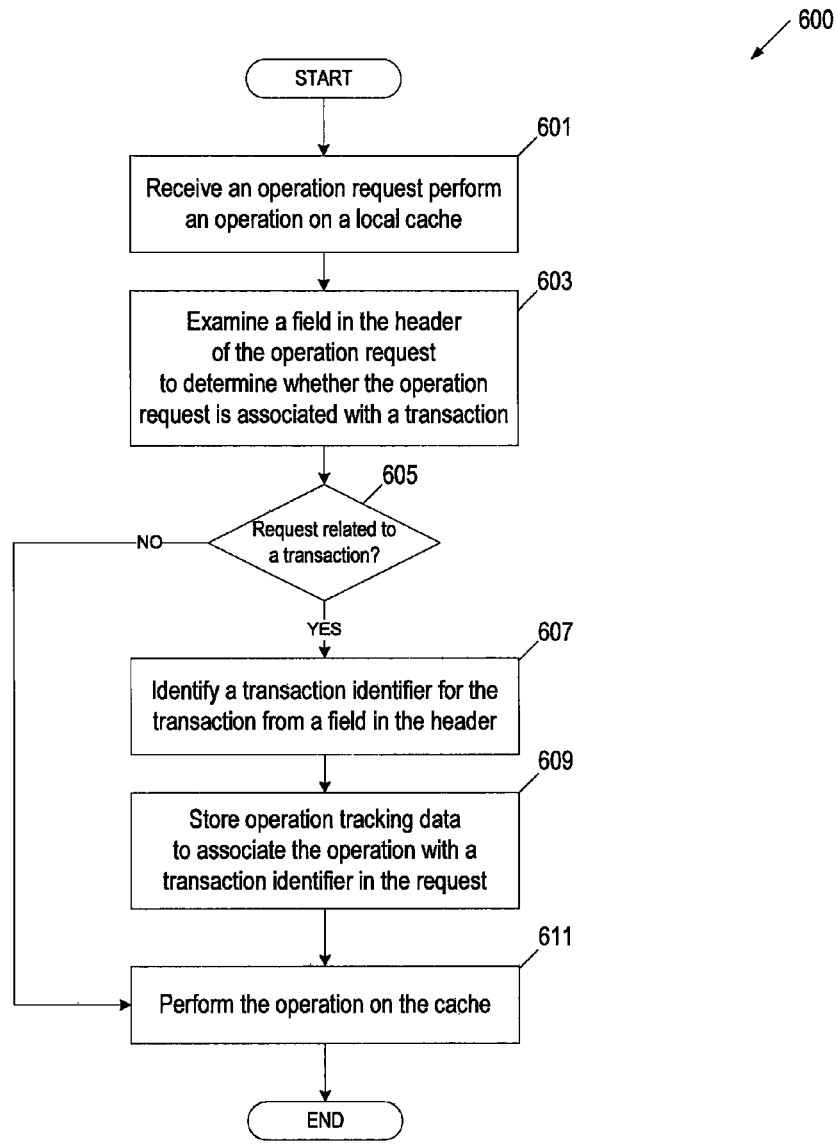
FIG. 6 is a flow diagram of an embodiment of a method for performing an operation relating to a multi-operational transaction on a cache in an in-memory data grid in a client-server environment.

FIG. 6 is a flow diagram of an embodiment of a method 600 for performing an operation relating to a multi-operational transaction on a cache in an in-memory data grid in a client-server environment. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by a data grid node 125A-D of FIG. 1. At block 601, the data grid node receives an operation request perform an operation on a local cache. The request may be to perform a get, put, remove, replace, prepare, rollback, commit, or recover. For example, the operation is to put a value of $0 in bank account number 5552191234. One embodiment of a method for performing a prepare, rollback, or commit is described in greater detail below in conjunction with FIG. 7. At block 603, the data grid node examines a field in the header of the operation request to determine whether the operation request is associated with a multi-operational transaction. If the operation request is not associated with a transaction (block 605), the data grid node performs the operation on the local cache at block 611. If the operation request is associated with a transaction (block 605), the data grid node identifies a transaction identifier for the transaction from a field in the header of the operation request and stores operation tracking data to associate the operation to be performed with the transaction identifier. The operation tracking data can include the transaction identifier and an operation identifier. At block 611, the data grid node performs the operation on the cache. Method 600 can be a recursive method, such that the data grid node can receive additional operation requests, determine whether a request is associated with a transaction, update the operation tracking data, and perform the operations. For example, the operation is to put a value of $1000 in bank account 5558675309.

Figure 7:
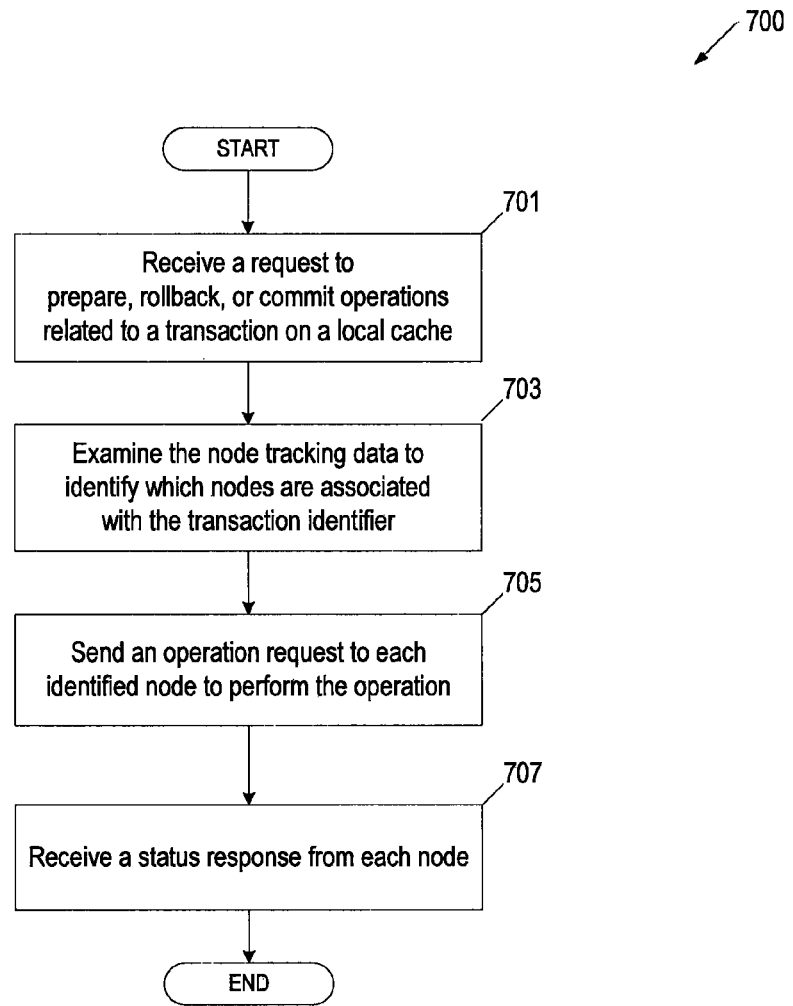
FIG. 7 is a flow diagram of an embodiment of a method for performing an operation relating to a multi-operational transaction on a cache in an in-memory data grid in a client-server environment.

FIG. 7 is a flow diagram of an embodiment of a method 700 for performing an operation relating to a multi-operational transaction on a cache in an in-memory data grid in a client-server environment. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by a resource manager data grid node, such as node 125C, of FIG. 1. At block 701, the resource manager data grid node receives an operation request to prepare, rollback, or commit the operations that were performed for a particular multi-operational transaction. The request header in the operation request includes a transaction identifier. At block 703, the resource manager data grid node examines the node tracking data to identify which nodes have performed operations that are associated with the transaction identifier. At block 705, the resource manager data grid node sends an operation request to each identified node to perform the operation. Each data grid node that is associated with the transaction identifier can receive the operation request, perform operation (e.g., prepare, rollback, commit), and send a status response to the resource manager data grid node. At block 707, the resource manage data grid node receives a status response from each node. Subsequently, the resource manager data grid node can send out another operation request based on the received status responses. For example, a status response can indicate that the operations that were performed were successfully prepared or that the operations were not successfully prepared. If the resource manager data grid node receives successful status responses from each of the node, the resource manager data grid node can send an operation request to the nodes that performed the prepare operations to now commit the operations. A commit request is a request to make a set of changes made to a resource permanent. In another example, if the resource manager data grid node receives a failed prepare response from one of the nodes, the resource manager data grid node can subsequently send an operation request to the nodes that attempted to prepare operations to now rollback the operations relating to the transaction identifier to a previous state.

Figure 8:
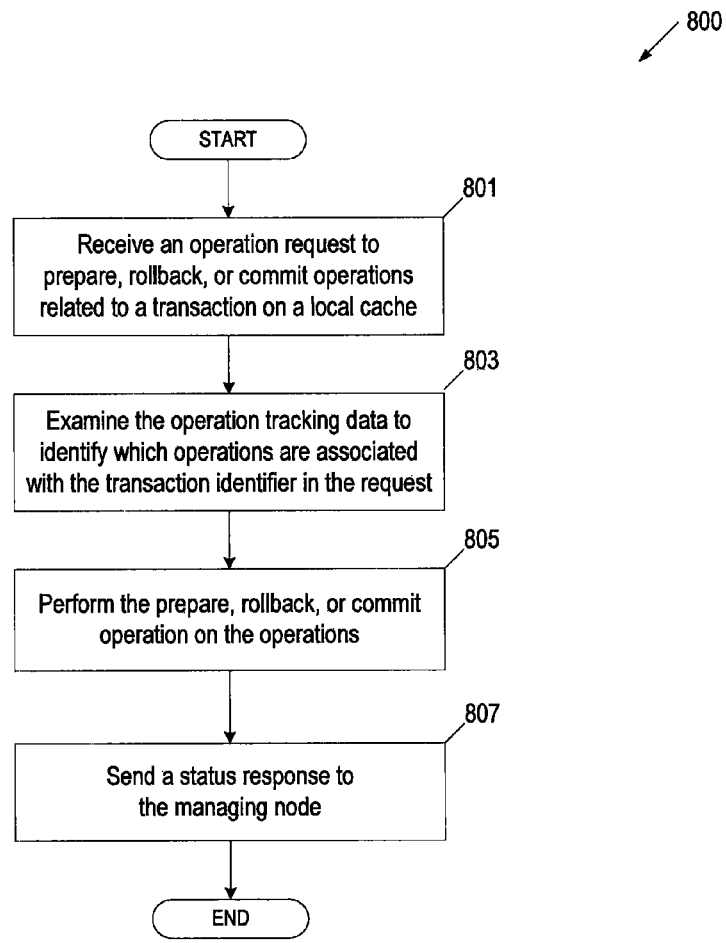
FIG. 8 is a flow diagram of an embodiment of a method for one or more nodes that are associated with a multi-operational transaction to perform an operation relating to the transaction.

FIG. 8 is a flow diagram of an embodiment of a method 800 for one or more nodes that are associated with a multi-operational transaction to perform an operation relating to the transaction. Method 800 can be performed by processing logic that can comprise hardware (e.g., circuitry, dedicated logic, programmable logic, microcode, etc.), software (e.g., instructions run on a processing device), or a combination thereof. In one embodiment, method 800 is performed by one or more data grid nodes 125A-D of FIG. 1. At block 801, each data grid node that has performed any operations relating to a particular multi-operational transaction receive an operation request to prepare, rollback, or commit the operations that were performed. The request header in the operation request includes a transaction identifier. At block 803, the data grid nodes examine the operation tracking data to identify which operations it performed that are associated with the transaction identifier. At block 805, the data grid nodes perform the requested operation (e.g., prepare, rollback, commit) and each data grid nodes sends a status response to the resource manager data grid node at block 807. For example, a status response can indicate that the operations that were performed by a particular data grid node were successfully prepared or that the operations were not successfully prepared. In another example, the response can indicate that the operations that were performed were successfully rolled back or that the operations were not successfully rolled back. In another example, the response can indicate that the operations that were performed were successfully committed or that the operations were not successfully committed.

Figure 9:
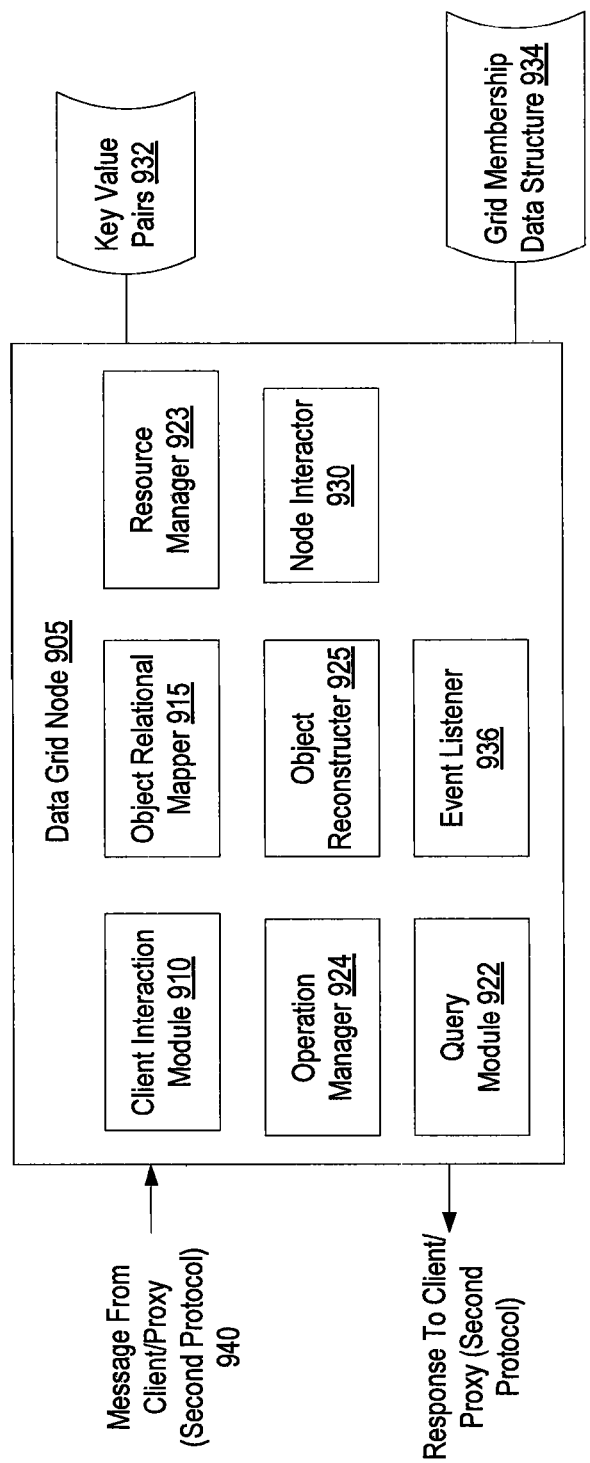
FIG. 9 illustrates a block diagram of a data grid node, in accordance with one embodiment of the present invention.

FIG. 9 illustrates a block diagram of a data grid node 905, in accordance with one embodiment of the present invention. The data grid node 905 may correspond to a resource manager data grid node that includes a resource manager, such as nodes 125C-D of FIG. 1. The data grid node 905 may correspond to a data grid node that can perform an operation on a cache, such as nodes 125A-D of FIG. 1. The data grid node 905 can include elements that are in addition to the data grid node 205 of FIG. 2C.

In one embodiment, the data grid node 950 includes a client interaction module 910, a resource manager 923, an operation manager 924, a node interactor 930, an object relational mapper 915, a query module 922, an object reconstructer 925, and an event listener 936. The node interactor 930 makes use of internet protocol (IP) based networking (e.g., transmission control protocol (TCP), user datagram protocol (UDP), etc.) to communicate with other data grid nodes. In one embodiment, the node interactor 930 issues remote procedure calls (RPCs) to neighbor nodes. The neighbor nodes invoke the RPCs, generate a response, and return the response to the data grid node that generated the RPCs. In one embodiment, the node interactor 930 uses JGroups Transport to communicate with other data grid nodes. Node interactor 930 performs peer discovery and manages membership of the data grid. In one embodiment, node interactor 930 maintains a grid membership data structure 934 that includes entries for each data grid node in the data grid. Each entry may include an address and/or a port of a data grid node. This membership data structure 934 may be used to determine which neighbor nodes to communicate with.

The client interaction module 910 receives requests from clients and sends responses to clients. Requests may include requests to store objects, to retrieve objects, to search for objects, to retrieve information about objects, and so on. Responses may include objects, information about objects, confirmation messages, error messages, etc.

Requests to store objects include the objects that are to be stored. These objects may be objects of a specific type that the data grid node 905 is configured to operate on. Object relational mapper 915 performs object relational mapping for data grids on received objects. In one embodiment, the object relational mapper 915 operates on Java objects such as plain old Java objects (POJOS). In one embodiment, the object relational mapper 915 operates on extensible JavaScript Object Notation (JSON) objects and/or JSON arrays. Alternatively, the object relational mapper 915 may operate on objects that are in the form of extensible markup language (XML) data.

A JSON object is an unordered collection of name value pairs. The values can be of the following types: Boolean, JSONArray, JSONObject, Number, String, or JSONObject-.null. The external form of a JSON object is a string wrapped in curly braces with colons between the names and the values, and commas separating name value pairs. The internal form is an object having get and opt methods for accessing values by name, and put methods for adding or replacing values by name. For multi-operational transaction support, the internal form is an object having prepare, rollback, and commit methods for processing (e.g., preparing, rolling back, committing) operations based on an associated with a transaction identifier. A JSON object constructor can convert a JSON object from the external form to the internal form.

The object relational mapper 915 is able to handle complex objects. A complex object is an object that has at least one complex field (a field that has a type other than a primitive type) or a relationship to another object or array. A complex field represents an internal or nested object. An object may include multiple layers of nested objects. For example, an object may include a complex field, which in turn may include another complex field, which may include another complex field, and so on. An additional layer of indirection may be introduced by each layer.

For a complex object, each internal object may be assigned its own primary key and its own unique identifier. Relationships between objects may be handled by using references (e.g., pointers) between primary key value pairs. Consider an example in which one object has a relationship to another object. The object that has the relationship to the other object would store in its primary key a reference to the unique identifier of that other object. The reference may be a pointer that resembles an in memory pointer except that instead of storing a memory reference, a UUID is stored.

In one embodiment, it is the responsibility of clients to designate unique identifiers for objects. The unique identifier designation may be included in the request to store the object. Alternatively, the data grid node 905 may generate unique identifiers for received objects and/or for internal objects of received objects. For example, a first field in the object may be used to generate a unique identifier for the object. A client may later retrieve an object based on that object's unique identifier. Note that the client does not need to remember the unique identifier for the object in one embodiment. Instead, the client may perform a query to determine the unique identifier for the object.

Object reconstructor 925 reconstructs objects from key value pairs 932. When a client needs to retrieve a stored object, the client sends the data grid node 905 a message 940 that includes the unique identifier for that object. The unique identifier may be a primary key in a primary key value pair that was generated for the object. The object reconstructor 925 gathers up all of the key value pairs 932 associated with that object, and puts them back together to reform the object.

In one embodiment, the object reconstructor 925 retrieves the primary key value pair that was generated for the object using the unique identifier. That primary key value pair includes references to key value pairs for each of the fields of that object. The primary key value pair and/or additional key value pairs may be stored on the data grid node 905 or on other data grid nodes. If any of the key value pairs are not stored on the data grid node 905, node interactor 930 communicates with other data grid nodes to retrieve those key value pairs 932.

If the object included an internal object (a complex field), then the primary key value pair includes a reference to another primary key value pair of the internal object. That internal object may have its own unique identifier, and may also have been divided into key value pairs. On retrieving the primary key value pair for the internal object (complex field), the object reconstructor 925 uses references included in that primary key value pair to retrieve additional key value pairs. This process continues until all key value pairs for the object and all internal objects have been retrieved.

Once all key value pairs are retrieved, the object reconstructor 925 uses those key value pairs to reconstruct the original object. The object can be reconstructed with all internal objects, references, types, values, etc. that the object originally had before it was stored.

In one embodiment, the data grid node 905 supports multi-tenancy. Therefore, data from different applications can be isolated in the same data store. Having multi-tenancy enabled allows different applications to store data having the same name or same primary key without any of this data being overwritten. Therefore, changes made to objects in a first application do not cause any modifications to objects of a second application, even if those objects share the same name and unique identifier. Thus, multi-tenancy provides a way to isolate data while still sharing the same data store. Data associated with different applications may be distinguished by using name spacing, in which the application's unique identifier as attached to the object's unique identifier in each primary key. Therefore, the unique identifier for an object may be a combination of the application's unique identifier and the object's unique identifier.

In one embodiment, data grid node 905 adds annotations to objects for indexing. For example, object relational mapper 915 may add annotations to key value pairs as they are generated. In one embodiment, data grid node 905 includes a query module 922. The query module 922 indexes objects stored in the data grid based on the annotations, and enables clients to perform searches on the objects. This enables clients to obtain objects within the data grid without needing to know the unique identifiers (primary keys) to each object that the client wants to obtain. For example, a user may search for the field name, and the name john. The query module 922 may then search the key value pairs for the value "john" in a key for the name field. For every match, the query module 922 may identify the object associated with that key value pair and the unique identifier for that object. This information may be returned to the client. In one embodiment, queries are expressed in Drools query language. Alternatively, other query languages may be used. For example, queries may be defined in XML, or may be Apache® Lucene® queries.

In one embodiment, the query module 922 provides fault tolerant queries. If the data grid node 905 crashes while executing a query, another data grid node will continue performing the query.

In one embodiment, data manager 975 keeps track of the number of references that are made to each object. If a reference count for an object is zero, then data manager 975 may enable that object to be deleted. This enables garbage collection.

Figure 10:
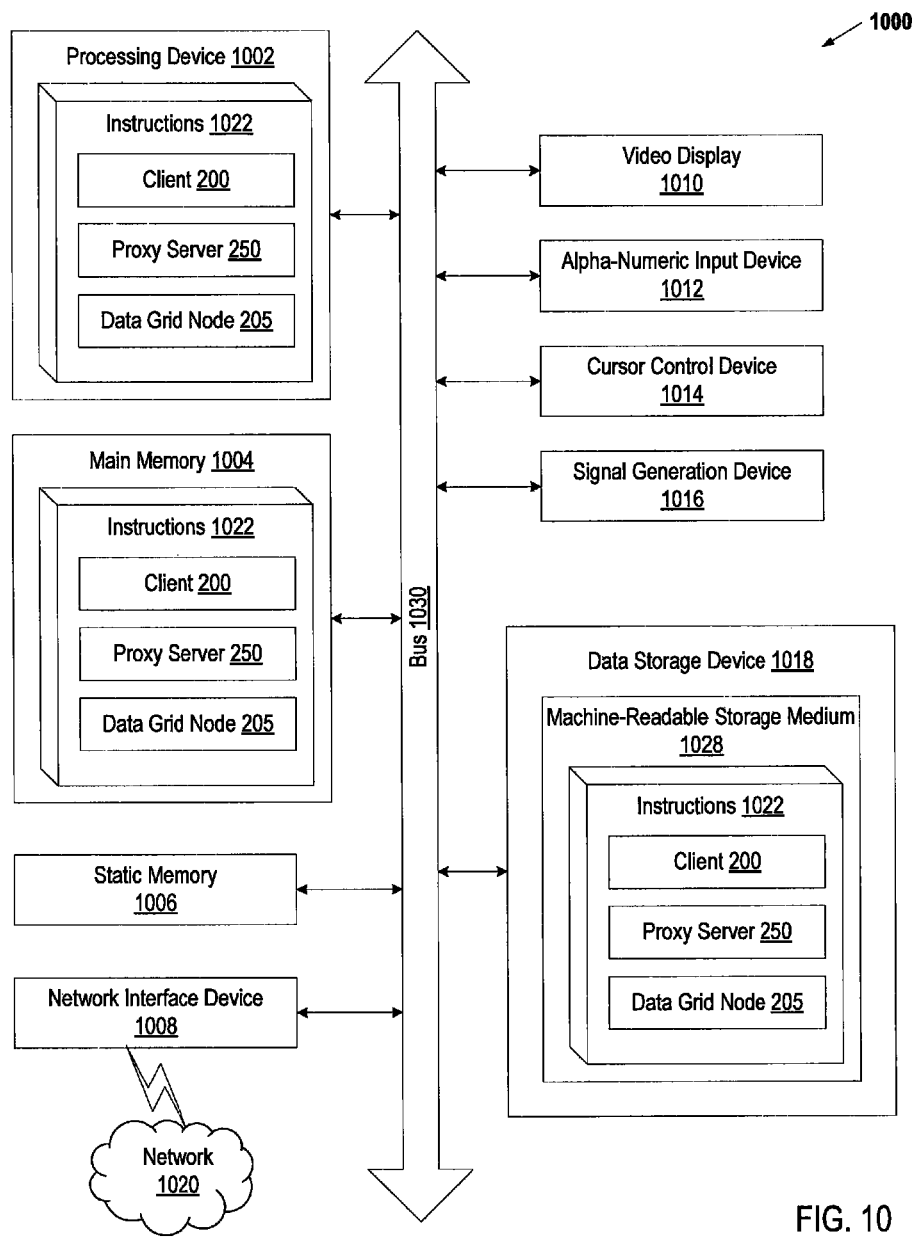
FIG. 10 is a diagram of one embodiment of a computer system for providing multi-operational transactional access of an in-memory data grid in a client-server environment.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) such as synchronous DRAM (SDRAM) or DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1022 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-readable storage medium 1028 (also known as a computer-readable medium) on which is stored one or more sets of instructions or software 1022 embodying any one or more of the methodologies or functions described herein. The instructions 1022 may also reside, completely or at least partially, within the main memory 1004 and/or within the processing device 1002 during execution thereof by the computer system 1000, the main memory 1004 and the processing device 1002 also constituting machine-readable storage media.

In one embodiment, the instructions 1022 include instructions for a data grid node and/or for a proxy server (e.g., client 200, data grid node 205, and proxy server 250 of FIGS. 2A-C and FIG. 9) and/or a software library containing methods that call a data grid node and/or a proxy server. While the machine-readable storage medium 1028 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, optical media and magnetic media.

Thus, techniques for using a shared data store for peer discovery in a peer-to-peer system are described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "storing" or "determining" or "sending" or "receiving" or "updating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
   identifying, by a processing device, a start of a multi-operational transaction pertaining to access of data stored in caches being managed by a plurality of nodes residing in virtual machines in an in-memory data grid;
   storing transaction context data indicating the start of the multi-operational transaction;
   identifying an application request to perform an operation pertaining to the multi-operational transaction, the application request from an application residing outside of the virtual machines;
   determining a transaction context of the operation based on the transaction context data; and
   sending, by the processing device, an operation request over a network to a managing node in the in-memory data grid, wherein the managing node manages the multi-operational transaction of accessing the caches being managed by the nodes in the in-memory data grid, and wherein the operation request comprises header data based on the transaction context data indicating that the processing device is in a multi-operational transaction mode.

2. The method of claim 1, further comprising:
storing resource management node tracking data to associate the multi-operational transaction with a node in the in-memory data grid to manage the multi-operational transaction, the resource management tracking data comprising a transaction identifier for the multi-operational transaction and a identifier for the managing node.

3. The method of claim 2, further comprising:
identifying a next application request to perform an operation, the next application request comprising a transaction identifier;
determining that the next application request is associated with a multi-operational transaction;
determining the managing node that is associated with the multi-operational transaction by comparing the transaction identifier in the next application request to the resource management node tracking data; and
sending a next operation request over the network to the managing node in the in-memory data grid that is associated with the multi-operational transaction, the next operation request including header data based on the transaction context data.

4. The method of claim 1, wherein the transaction context data comprises at least one of a transaction type or a transaction identifier.

5. The method of claim 1, wherein the multi-operational transaction is an X/Open XA (XA) transaction comprising a plurality of operations to access the caches being managed by the nodes in the in-memory data grid.

6. The method of claim 1, wherein sending the operation request over the network to the managing node in the in-memory data grid comprises sending the operation request over the network using a Hot Rod™ protocol.

7. A method comprising:
receiving, by a node in a server computing system in an in-memory data grid, a request from a client computing system to perform an operation pertaining to multi-operational transactional access of data stored in caches being managed by a plurality of nodes residing in virtual machines in the in-memory data grid, the request being a translation of an original request from an application residing outside of the virtual machines and comprising header data based on transaction context data indicating that the client computing system is in a multi-operational transaction mode;
identifying a node having cache data relating to the operation in the in-memory data grid;
storing node tracking data to associate the identified node with a transaction identifier for the multi-operational transaction in the request; and
sending the request to the identified node, wherein the identified node performs the requested operation on the cache and stores operation tracking data to associate the operation with the transaction identifier.

8. The method of claim 7, further comprising:
receiving a next request to perform an operation pertaining to multi-operational transactional access of the data stored in the in-memory data grid, the next request being a translation of an original next request from the application residing outside of the virtual machines;
identifying a node having cache data relating to the operation in the in-memory data grid;
updating the node tracking data to associate the identified node with a transaction identifier for the multi-operational transaction in the next request based on a determination that the identified node is not being tracked in the node tracking data; and
sending the next request to the identified node, wherein the identified node performs the requested operation on the cache and stores operation tracking data to associate the operation with the transaction identifier.

9. The method of claim 7, further comprising:
receiving at least one of a prepare request to prepare the operations pertaining to transaction identifier for commitment or a rollback request to rollback the operations pertaining to transaction identifier;
identifying one or more nodes in the plurality of nodes that are associated with the transaction identifier based on the node tracking data; and
sending the at least one of the prepare request or the rollback request to the identified nodes, wherein the identified nodes at least one of prepare the operations or rollback the operations pertaining to the transaction identifier based on the operation tracking data.

10. A system comprising:
a first memory to store transaction context data indicating a start of a multi-operational transaction; and
a first processing device coupled to the first memory to:
identify the start of the multi-operational transaction pertaining to access of data stored in caches being managed by a plurality of nodes residing in virtual machines in an in-memory data grid;
identify an application request to perform an operation pertaining to the multi-operational transaction, the application request from an application residing outside of the virtual machines;
determine a transaction context of the operation based on the transaction context data; and
send an operation request over a network to a managing node in the in-memory data grid, wherein the managing node manages the multi-operational transaction of accessing the caches being managed by the nodes in the in-memory data grid, and wherein the operation request comprises header data based on the transaction context data indicating that the first processing device is in a multi-operational transaction mode.

11. The system of claim 10, further comprising:
a data store to store resource management node tracking data to associate the multi-operational transaction with a node in the in-memory data grid to manage the multi-operational transaction, the resource management tracking data comprising a transaction identifier for the multi-operational transaction and a identifier for the managing node.

12. The system of claim 11, wherein the processing device is further to:
identify a next application request to perform an operation, the next application request comprising a transaction identifier;
determine that the next application request is associated with a multi-operational transaction;
determine the managing node that is associated with the multi-operational transaction by comparing the transaction identifier in the next application request to the resource management node tracking data; and
send a next operation request over the network to the managing node in the in-memory data grid that is associated with the multi-operational transaction, the next operation request including header data based on the transaction context data.

13. The system of claim 10, wherein the multi-operational transaction is an X/Open XA (XA) transaction comprising a plurality of operations to access the caches being managed by the nodes in the in-memory data grid.

14. The system of claim 10, further comprising:
a plurality of caches;
a plurality of nodes residing in virtual machines in an in-memory data grid to manage the plurality of caches;
wherein at least one node comprises:
- a second memory to store node tracking data to associate an identified node with a transaction identifier for a multi-operational transaction in a request; and
- a second processing device coupled to the second memory to:
  - receive the request to perform the operation pertaining to multi-operational transactional access of data stored in the caches, the request being a translation of an original request from an application residing outside of the virtual machines and comprising header data based on the transaction context data indicating that the second processing device is in a multi-operational transaction mode;
  - identify a node having cache data relating to the multi-operational transaction; and
  - send the request to the identified node, wherein the identified node performs the requested operation on the cache and stores operation tracking data to associate the operation with the transaction identifier.

15. A non-transitory computer-readable storage medium including instructions that, when executed by a processing device, cause the processing device to perform a set of operations comprising:
- identifying a start of a multi-operational transaction pertaining to access of data stored in caches being managed by a plurality of nodes residing in virtual machines in an in-memory data grid;
- storing transaction context data indicating the start of the multi-operational transaction;
- identifying an application request to perform an operation pertaining to the multi-operational transaction, the application request from an application residing outside of the virtual machines;
- determining a transaction context of the operation based on the transaction context data; and
- sending, by the processing device, an operation request over a network to a managing node in the in-memory data grid, wherein the managing node manages the multi-operational transaction of accessing the caches being managed by the nodes in the in-memory data grid, and wherein the operation request comprises header data based on the transaction context data indicating that the processing device is in a multi-operational transaction mode.

16. The non-transitory computer-readable storage medium of claim 15, the operations further comprising:
- storing resource management node tracking data to associate the multi-operational transaction with a node in the in-memory data grid to manage the transaction, the tracking data comprising a transaction identifier for the multi-operational transaction and a identifier for the managing node.

17. The non-transitory computer-readable storage medium of claim 16, the operations further comprising:
- identifying a next application request to perform an operation, the next application request comprising a transaction identifier;
- determining that the next application request is associated with a multi-operational transaction;
- determining the managing node that is associated with the multi-operational transaction by comparing the transaction identifier in the next application request to the resource management node tracking data; and
- sending a next operation request over the network to the managing node in the in-memory data grid that is associated with the multi-operational transaction, the next operation request including header data based on the transaction context data.

18. The non-transitory computer-readable storage medium of claim 15 wherein the transaction context data comprises at least one of a transaction type or a transaction identifier.

19. The non-transitory computer-readable storage medium of claim 15, wherein the multi-operational transaction is an X/Open XA (XA) transaction comprising a plurality of operations to access the caches being managed by the nodes in the in-memory data grid.

20. The non-transitory computer-readable storage medium of claim 15, wherein sending the operation request over the network to the managing node in the in-memory data grid comprises sending the operation request over the network using a Hot Rod™ protocol.

* * * * *